United States Patent [19]

Omata et al.

[11] Patent Number: 4,609,573
[45] Date of Patent: Sep. 2, 1986

[54] PROCESS FOR INHIBITING CORROSION OF STEEL MATERIALS BUILT IN INORGANIC MATERIALS

[75] Inventors: Kazuo Omata, Ichikawa; Toshihiko Shimizu, Narashino; Hiroshi Ibe, Higashikurume; Kenji Hara, Chiba, all of Japan

[73] Assignee: Onoda Construction Materials Co., Ltd., Tokyo, Japan

[21] Appl. No.: 710,830

[22] Filed: Mar. 12, 1985

[30] Foreign Application Priority Data

Apr. 27, 1984 [JP] Japan .................................. 59-83892

[51] Int. Cl.$^4$ ............................................. B05D 1/36
[52] U.S. Cl. .................................... 427/403; 427/140; 427/142
[58] Field of Search .................... 427/403, 140, 142

[56] References Cited

U.S. PATENT DOCUMENTS

| 2,998,328 | 8/1961 | Munger et al. ............... 427/403 X |
| 3,030,664 | 4/1962 | Wijard .......................... 427/403 X |
| 4,088,804 | 5/1978 | Cornwell et al. ................. 428/220 |
| 4,443,496 | 4/1984 | Dbitsu et al. ................... 427/140 |
| 4,536,417 | 8/1985 | Shimizu ......................... 427/140 |

FOREIGN PATENT DOCUMENTS 0121661 9/1981 Japan .................................. 427/403

*Primary Examiner*—Thurman K. Page
*Attorney, Agent, or Firm*—Jordan and Hamburg

[57] ABSTRACT

The present invention relates to a process for inhibiting corrosion of an existing steel material built in an inorganic material by applying an aqueous solution of an inorganic salt, an aqueous solution of a water-soluble silicate compound and a cement composition having corrosion-inhibiting effects on the surface of the inorganic material.

3 Claims, 2 Drawing Figures

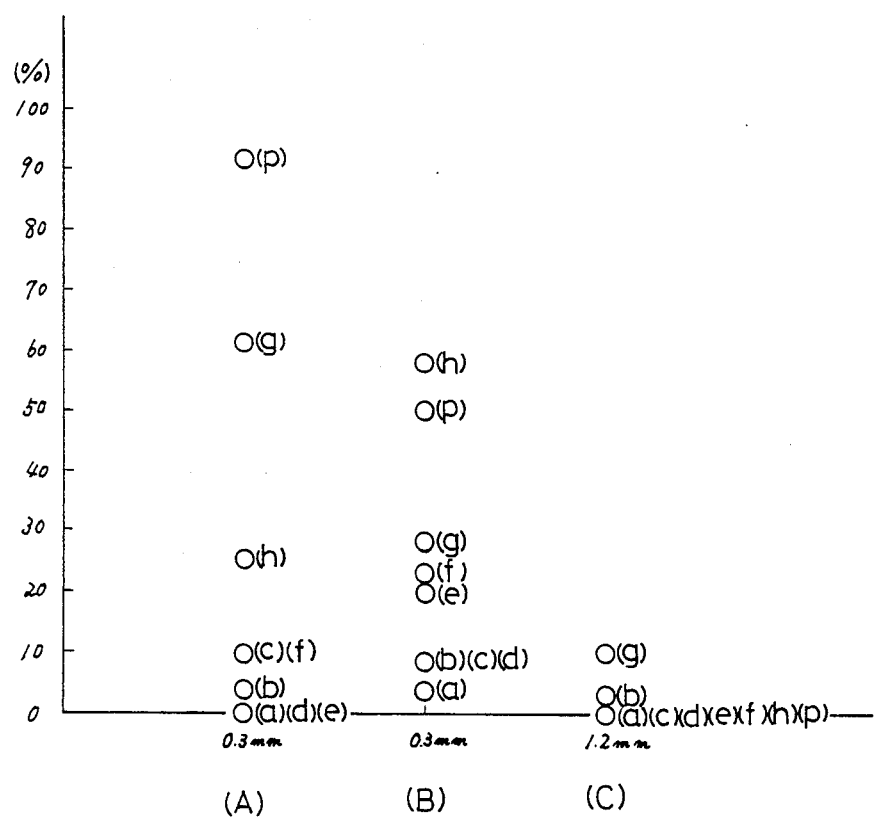

PROCESS FOR INHIBITING CORROSION OF STEEL MATERIALS BUILT IN INORGANIC MATERIALS

FIELD OF THE INVENTION

The present invention relates to a process for inhibiting corrosion of steel materials built in inorganic materials having a high chlorine ion concentration.

DESCRIPTION OF THE PRIOR ART

It has been known that steel materials are quite difficultly corroded under a high alkaline condition occurring in an inorganic substance such as concrete. The steel materials are, therefore, not corroded even when no corrosion inhibition treatment is utilized in general. However, it has also been known that when the inorganic material surrounding the steel material has a high chlorine ion concentration, the steel material is relatively easily corroded even under a non-neutralized, alkaline condition. The mechanism of this phenomenon may be explained as follows:

Under a highly alkaline condition, the steel material has an oxidized film of $\gamma$-$Fe_2O_3$ formed on its surface which film inhibits the corrosion of the steel material. This is called passivity. However, when chlorine ions are introduced therein by, for example, a chloride contaminant, the passivated film is broken. The breakage of the film occurs generally locally to expose the steel material. As a result, the exposed narrow part acts as an anode and the other broad part covered by the passivated film acts as a cathode to cause a large potential difference between them and, therefore, only the anode (narrow part) is corroded. As a result, so-called "pitting corrosion" takes place in spots on the surface of the steel material.

The effective sectional area of the steel material is rapidly reduced by the pitting corrosion and it is, therefore, dangerous even when the number of the spots is small. When the number of the spots is increased remarkably, the spots are interconnected with each other to finally spread all over the surface of the steel material.

In an initial stage of the corrosion of the steel material, ferrous hydroxide $Fe(OH)_2$ is formed. This compound is unstable and immediately oxidized into iron oxides such as $\alpha$-$FeOOH$ and $Fe_3O_4$ which are the main components of rust. In the course of the rust formation, the volume of the steel material expands. As a result, when the inorganic material reinforced by the steel material is reinforced concrete, the expansion is restricted by the concrete and, therefore, a high expansion pressure is applied to the concrete surrounding the reinforcing steel rods to frequently cause cracks along the rods in the surrounding concrete. When the cracking proceeds further, the surrounding concrete falls off. In the next stage, the corrosion of the steel rods further advances to increase the sectional breakage of the rods and finally the structure is broken.

Causes for the introduction of chlorine ion which thus damages the inorganic material having the steel material built therein (hereinafter referred to as "reinforced concrete", etc.) are as follows:

(1) use of sea sand as a fine aggregate,
(2) the location of the concrete structure in a marine environment,
(3) application of a deicer, and
(4) use of a chemical admixture containing a large amount of a chloride.

In using sea sand as the fine aggregate, the salt can be removed by washing it with water. In fact, however, it is difficult to completely remove the salt and therefore, this means is not so frequently employed.

Calcium chloride having a high chlorine ion content was used previously as a concrete admixture in a large amount so as to accelerate the hardening of the concrete. The chlorine admixture used is now reduced in amount but it was used for longer than 20 years in the past and reinforced concrete constructions containing a large amount of chlorine ions are still in existence.

Marine concrete structures are now increasing in number because of their easiness of maintenance. However, the structures are always exposed to the salt fed externally and its penetration cannot be prevented unless they are covered with a perfect water-impermeable coating.

Since it is thus difficult to prevent the penetration of the salt into the reinforced concrete structures, etc., the development of a process for inhibiting the corrosion of the steel materials even when the salt penetrates therein is demanded.

The specification of Japanese Pat. Nos. 937,065, 941,253, 554,656 and 987,505 have disclosed the use of a concrete admixture to inhibit the corrosion of the reinforcing rods in a reinforced concrete structure when the incorporation of a harmful amount of chlorine ions is unavoidable due to, for example, the use of sea sand. On the basis of this technique, "corrosion inhibitors for reinforced concrete" have been prescribed in JIS A 6205 and the effects of the concrete admixtures are highly evaluated.

However, these corrosion inhibitors have been used by kneading them with another inorganic material in a step of casting the concrete. Thus, it has not been considered yet to use the corrosion inhibitor as a repairing material (or reinforcing material) for existing reinforced concrete structures.

After intensive investigations of corrosion inhibiting effects on reinforcing rods obtained by applying said corrosion inhibitor to the surface of the inorganic material in an existing reinforced concrete structure or the like containing a harmful amount of the salt so as to effect impregnation, the inventors previously found that this process was quite effective in inhibiting corrosion of the reinforcing rods. The inventors also found that the corrosion inhibition effect does not last for a long time by the mere application and impregnation, since the corrosion inhibitor is still soluble in water even after the aqueous corrosion inhibitor solution has been dried, and that said effect can be sustained by coating the surface of the structure with a concrete composition after the application of the corrosion inhibitor. Such invention was the subject matter of a patent application previously filed.

A process has been employed and highly evaluated wherein an aqueous solution of a water-soluble silicate compound is applied to a reinforced concrete structure to effect impregnation when it has been neutralized (carbonized) and deteriorated so that the deteriorated parts are repaired and the neutralized concrete which covers the reinforcing rods is made alkaline to recover the effect of inhibiting the corrosion of the reinforcing rods. However, according to this process, the effect of inhibiting the corrosion of the reinforcing rods due to the salt introduced therein together with sea sand, due to the penetration of sea water or due to chlorine ions of calcium chloride or the like used as a hardening accelerator cannot be expected.

SUMMARY OF THE INVENTION

After investigations made for the purpose of developing a more effective process for inhibiting the corrosion of steel materials in inorganic materials, the inventors have found that when as aqueous solution of a water-soluble silicate compound which acts as a neutralizer or a recovering agent after deterioration is applied to the inorganic material to effect impregnation prior to or after the impregnation of said corrosion inhibitor (such as "corrosion inhibitor for reinforced concrete" according to JIS A 6025), the effects thereof becomes synergistic to remarkably improve the corrosion-inhibiting effect on the reinforcing rods. The inventors have further found that when the surface of the inorganic material thus impregnated is top-coated with a cement composition, they are not dissolved out of the inorganic material into water and the effects last semipermanently. The present invention has been completed on the basis of these findings.

The present invention provides (1) a process comprisng subjecting the surface of an inorganic material having a steel material built therein to step (A) wherein an aqueous solution of an inorganic salt having a corrosion-inhibiting effect on said steel material is applied to the surface of the inorganic material to impregnate said material with the solution and step (B) wherein an aqueous solution of a water-soluble silicate compound is applied thereto to effect impregnation, steps (A) and (B) being effected in any order, and (2) a process comprising top-coating the surface of the inorganic material with a cement composion after subjecting it to steps (A) and (B) in any order in the same manner as in the process (1).

An object of the present invention is to provide a process for inhibiting corrosion of steel materials built in inorganic materials which process is capable of inhibiting the corrosion of a steel material built in an inorganic material having a high chlorine ion concentration by effecting the treatment even after casting of a reinforced concrete.

The term "inorganic materials having steel materials built therein" herein include reinforced concrete, steel-frame concrete, lath mortar, steel fiber concrete, etc.

The term "inorganic salts having a corrosion inhibition effect" (corrosion inhibitors for concrete, etc.) herein refers to those capable of controlling an electrochemical corrosion reaction by forming an anticorrosive film on an anode and a cathode when it is used in a small amount under a corrosive conditon, i.e. in the presence of chlorine ions. The corrosion inhibitors may be classified into the following two groups:

(1) a group of anodic corrosion inhibitors:

This group includes nitrites, chromates, etc. They oxidize the surface of the steel material directly or indirectly to form an intimate metal oxide film on said surface, whereby inhibiting the anodic reaction.

(2) a group of cathodic corrosion inhibitors:

This group includes carbonates, phosphates, polyphosphates, etc.

They form a film of a difficult water-soluble salt with another ion present under corrosive conditions on the surface of the steel material (cathodic parts) to inhibit the cathodic reaction.

The amounts of these corrosion inhibitors represented by percentages based on chlorine ions (in terms of the common salt) contained in an inorganic material, such as existing concrete, are as follows:

calcium nitrite: at least 3%
sodium nitrite: at least 3%
calcium phosphate [$Ca_3(PO_4)_2$]: at least 4%
sodium chromate: at least 2%

The corrosion inhibitor is necessitated in a large amount when the inorganic material such as concrete has been neutralized (carbonized), though a small amount thereof will suffice when the neutralization (carbonation) has not proceeded and the pH is high.

By the application of the corrosion inhibitor of the present invention, a neutralized (carbonized) state of the concrete can be returned to a strongly alkaline state, since the corrosion inhibitor is highly alkaline (for example, the most frequently used 30% calcium nitrite soluton has a pH value of 11 to 12). Immediately after the application of the 30% calcium nitrite solution most frequently used as the corrosion inhibitor of the present invention to a mortar (having a ratio of cement to an aggregate of 1:3) or concrete, the depth of penetration was at least 4 mm. It has been found that said solution gradually penetrated therein by ionic diffusion with time.

The term "water-soluble silicate compounds" herein refers to silicates of the general foumula; $M_2O.nSiO_2$, wherein M represents Li, Na, K, Cs or ammonium and n represents an integer, and mixtures thereof. Ammonium components include primary amines such as methylamine and ethylamine, secondary amines such as dimethylamine and diisopropylamine, tertiary amines such as trimethylamine and triethanolamine, quaternary amines such as monomethyltriethanolammonium and tetraethanolammonium and ammonia. The number n is not particularly limted, though it is preferably about 1 to 5. The number n may be any which does not affect the water solubility or penetrability in the actual use. An additive such as a hardening agent which improves water resisitance of the water-soluble silicate compound after the drying/hardening may be used unless it affects the workability or penetrability. When using the water-soluble silicate alone, it is preferred to use lithium silicate having a relatively high water resistance. Though the concentration of the silicate compound in its aqueous solution is not particularly limited, it is usually up to 30%.

The cement composition to be used for forming a top coating on the surface of the inorganic material so as to prevent the dissolution of the inorganic salt and water-soluble silicate compound penetrated therein is a paste prepared by kneading a cement such as Portland cement, a Portland cement mixture, ultra-quick hardening cement (jet cement) or white cement with a suitable amount of water. The cement composition may be mixed with up to about 150%, based on the cement, of a fine aggregate the amount of which varies depending on the workability. The cement composition according to the present invention may contain a polymer dispersion which improves the water proof properties of the cement composition. Though the amount of the polymer dispersion to be incorporated into said cement is not particularly limited because it varies depending on the variety thereof, it is preferred usually to use it in an amount of 0.5 to 25% (as solid) based on the cement. The most suitable polymer dispersion is an anionically polymerized styrene/butadiene rubber dispersion (SBR-A). There may also be used paraffin, asphalt, rubber asphalt, vinyl acetate, ethlene/vinyl acatate copolymer, acrylic resin and epoxy resin emulsions as well as NBR, natural rubber, chloroprene and MMA.B latexes. In addition, an emulsifier and stabilizer may also be incorporated in the cement unless they cause any trouble.

BRIEF DESCRIPTION OF THE DRAWINGS

The accompnying drawings illustrate the test results, in which:

FIG. 2 shows the results of the measurement of the area of corrosion of reinforcing rod.

DESCRIPTION OF THE PREFERRED EMBODIMENTS

Figure 1:
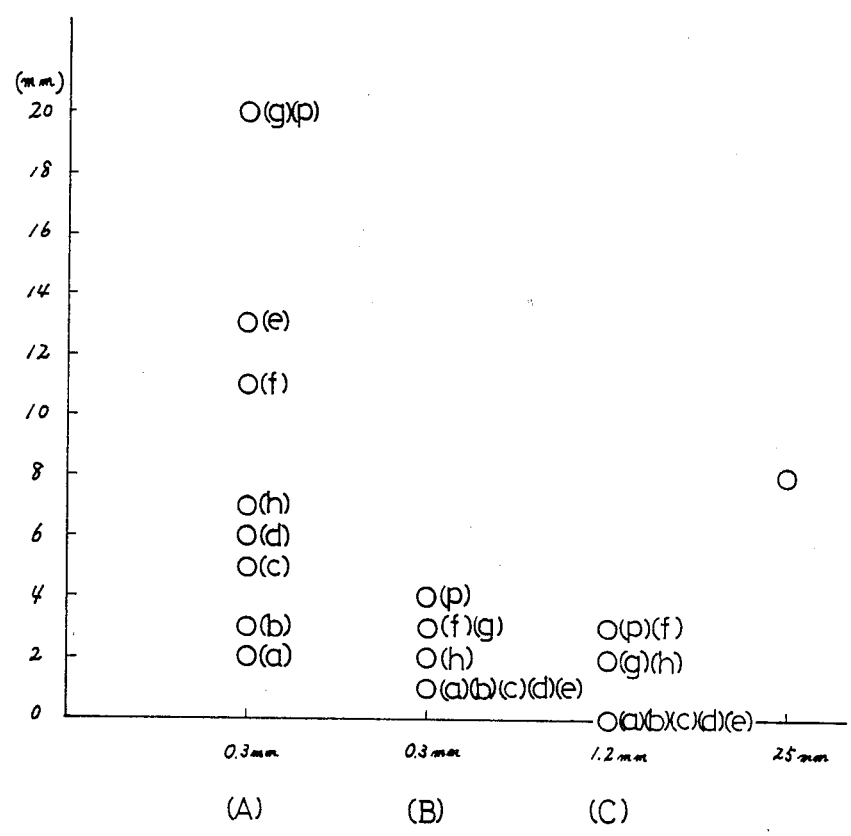
FIG. 1 shows the results of the depth of neutralization.

The cement compositions were prepared by using the above-mentioned SBR-A and some other polymer dispersions and the depth of the neutralization (carbonation) and the area of corrosion of them were examined by the following test methods to obtain the results shown below:

(1) Base mortars used:

(A) standard composition for evalution of performance of polymer dispersion according to JIS:
maximum particle size of aggregate: 0.3 mm
amount of cement: 25%
ratio of cement to sand (Toyoura standard sand): 1:3
(B)
maximum particle size of aggregate: 0.3 mm
amount of cement: 50%
cement filler
(C)
maximum particle size of aggregate: 1.2 mm
amount of cement: 30%
mending mortar for summer (2) Polymer dispersions used:
(a) SBR-A,
(b) ethylene/vinyl acetate/vinyl chloride terpolymer emulsion,
(c) acrylic ester emulsion,
(d) acrylic ester/styrene copolymer emulsion,
(e) ethylene/vinyl acetate copolymer emulsion,
(f) styrene/butadiene copolymer emulsion prepared by cationic polymerization,
(g) vinyl acetate/vinyl versatate copolymer emulsion (redispersible powder),
(h) vinyl acetate/laurate/versatate terpolymer (redispersible powder), and
(i) no polymer dispersion added.

(3) Ratio of base mortar to polymer dispersion: 100:4.5
(4) Amount of water (JIS A 1173)
Amount of water necessitated for the slump of 35±5%

(5) Test methods:
(A) depth of neutralization (carbonation)
A mortar sample was kept in carbon dioxide (100%, 4 kg/cm$^2$) for 5 h and then a phenolphthalein indicator was sprayed on the broken surface. The depth of the part not colored red was measured.

(B) Corroded area of reinforcing rod:
A sample comprising a mortar (4×4×8 cm) containing a reinforcing iron rod having a diameter of 10 mm and a length of 10 cm in the center thereof was dried in air at 60° C. for 2 days and then immersed in a 5% common salt solution at 20° C. for 2 days. This cycle was repeated 10 times in total. The corrosion was copied onto a polyethylene sheet and its development was prepared. After copying, the corroded area was determined by means of a video pattern analyzer.

(6) Test results:
The results of the measurement of the depth of neutralization effected by using 8 polymer dispersions are shown in FIG. 1.

The results of the measurement of the area of corrosion of reinforcing rod effected by using 8 polymer dispersions are shown in FIG. 2.

From the results of both cases shown in FIGS. 1 and 2, it is understood that SBR-A is superior to others.

In the treatment of exposed parts of reinforcing rods and marine structures, more excellent effects can be expected when a commercially available corrosion inhibitor for reinforced concrete is added to said cement composition.

In the present invention, the cement composition (particularly polymer cement paste) is applied to the surface of the inorganic material imporegnated with the aqueous solution of the corrosion-inhibiting inorganic salt to form a top coating so as to keep the corrosion-inhibiting effects of said inorganic salt and water-soluble silicate compound permanently (the second invention). It has been found that the inorganic salts such as nitrites are effective in making the adhesion between the inorganic material and the polymer cement paste firm.

A 30% calcium nitrite solution and a 12% water-soluble lithium silicate solution were applied alone or alternately to flat concrete plates for a footway to form a top coating and a polymer cement paste was further applied thereto. The adhesion between them was measured to obtain the results shown in Table 1 below.

The adhesion test conditions were as follows:
Flat concrete plates for a footway according to JIS A 5304 (300×300×60 cm) were partitioned into five portions. Calcium nitrite and/or lithium silicate were applied thereto as described below, and the polymer cement paste was applied thereto. The tensile strength of each portion was measured by the method of JIS A 6915.
a. no treatment,
b. calcium nitrite only,
c. lithium silicate only,
d. calcium nitrite and then lithium silicate, and
e. lithium silicate and then calcium nitrite.

The obtained results clearly proved the effect of calcium nitrite in improving the adhesion.

The mechanism of realizing the synergistic effects in the corrosion inhibition of the solution of the inorganic salt such as the nitrite and the aqueous sqlution of the water-soluble silicate compound applied to the surface of the inorganic material having the steel material built therein in the present invention is considered as follows:

The aqueous solution of the water-soluble silicate compound is essentially unstable to chemicals and, therefore, when the aqueous soluton thereof is mixed with an aqueous solution of a corrosion inhibitor such as a nitrite to form a liquid mixture, gelation occurs immediately to form a solid.

Thus, when the concrete is impregnated with the two above-mentioned aqueous solutions successively, gelation occurs in the concrete tissue and the active components in both solutions are fixed in the concrete tissue.

Thus, when the neutralized (carbonized) concrete is impregnated with the aqueous solution of the water-soluble silicate compound and the corrosion inhibitor successively, the effects exhibited when they are used separately, such as alkalization of the neutralized concrete, solidification and reinforcement of deteriorated parts of the concrete and inhibition of corrosion of the iron reinforcing rods due to chlorine ion, can be obtained and, in addition, voids in the concrete tissue are filled up, cracks in the concrete are also filled up and suture/repairment effects are also expected.

Model experiments as described below were conducted to determine the extent of corrosion of the steel materials built in the inorganic materials having a high chlorine ion concentration and the corrosion-inhibiting effects of the inorganic salts and water-soluble silicate compounds used in the present invention on the steel materials. The results are shown below.

[1] Method of experiment:

(a) Each 1 l of 12 solutions of 0 to 24 g/l of calcium nitrite and 0 to 16 g/l of lithium silicate in a 1.3% (13 g/l) aqueous common salt solution was prepared in each beaker. Iron rods having the same shape and an equal weight (d=10 cm and L=10 mm) were immersed therein. The 1.3% aqueous common salt solution was employed in this experiment because the chlorine ion concentration in reinforced concrete casted in the prior art was up to about 2.4 kg/m$^3$ (in terms of common salt) according to the theoretical calculation from the amount of sea sand or chemical admixture used (in case the unit amount of water is 180 kg, the value is 2.4 kg/180 kg, i.e. 0.013).

(b) 12 aqueous solutions having the same compositions as in the above item (a) were saturated with calcium hydroxide. Iron rods were immersed therein in the same manner as above (calcium hydroxide was added so as to realize a condition close to that in the concrete).

(c) After 8 days, the iron rods were taken out from the solutions and the amounts of rust was measured.

[2] Results of experiments:

The results of the experiments performed as above are shown in Table 2. The amount of rust was represented in terms of mg per cm$^2$ of the rod.

It is apparent from Table 2 that lithium silicate and calcium nitrite inhibit synergically the corrosion of the steel materials.

EXAMPLE 1

A concrete-finished building having seven stories above and one under the ground (normal concrete construction up to 3 stories and light-weight concrete construction above the third story) built 15 years ago was repaired, since the concrete surface became powdery and cracked and the bleeding of the concrete and exposure of the iron reinforcing rods became serious.

The concrete of the building had a chlorine content of 0.042% (0.16% based on the fine aggregate) and a depth of neutralization (carbonation) of 25 to 35 mm. In the repair work, the concrete surface was washed with water under a high pressure and dried before a corrosion inhibitor for iron reinforcing rods containing 30% of calcium nitrite was applied thereto by means of a rolling brush twice repeatedly (400 g/m$^2$) to effect the impregnation. A surface-reinforcing alkalizing agent containing 12% of lithium silicate was applied thereto by means of a rolling brush twice repeatedly (400 g/m$^2$) to effect impregnation and the concrete surface thus treated was dried and finished by applying multi-layer coatings with decorative pattern thereon.

One year after the repair, the building was inspected to find no trouble.

EXAMPLE 2

The same building as in Example 1 was washed with water under a high pressure and the corrosion inhibitor for iron reinforcing rods was applied thereto to effcet impregnation. The surface-reinforcing alkalizing agent was then applied thereto to effect impregnation in the same manner as in Example 1.

A polymer cement mortar containing 4.5% (in terms of solids) of SBR-A and having a ratio of cement to sand of 1:1 was sprayed thereon to form a film having a thickness of 2 mm. After hardening, multi-layer coatings with decorative pattern was applied thereon.

One year after the repair, the building was inspected to find no trouble.

Thus, according to the process of the present invention for inhibiting the corrosion of the steel material built in the inorganic material, the salt (chlorine ion) in the inorganic material of an existing structure can be made harmless easily. The iron reinforcing rods (steel material) in the inorganic material can be protected and the corrosion thereof can be inhibited by the easy repair work according to the present invention.

TABLE 1

| | | Adhesion Test | | | |
| | | average | broken area (%) | | |
| sample | strength kg/cm$^2$ | strength kg/cm$^2$ | polymer cement | concrete | adhesion surface |
|---|---|---|---|---|---|
| no        a 1 | 9.1  | 9.0  | 95 | 5  | 0  |
| treatment a 2 | 8.3  |      | 70 | 30 | 0  |
|           a 3 | 9.6  |      | 60 | 10 | 30 |
| treatment b 1 | 11.3 | 11.5 | 95 | 5  | 0  |
|           b 2 | 11.6 |      | 70 | 0  | 30 |
|           b 3 | 11.7 |      | 90 | 5  | 5  |
|           c 1 | 6.9  | 8.2  | 90 | 10 | 0  |
|           c 2 | 8.9  |      | 90 | 10 | 0  |
|           c 3 | 8.8  |      | 90 | 10 | 0  |
|           d 1 | 10.6 | 11.1 | 90 | 5  | 5  |
|           d 2 | 11.6 |      | 45 | 5  | 45 |
|           e 1 | 10.1 | 9.3  | 85 | 15 | 0  |
|           e 2 | 10.3 |      | 85 | 15 | 0  |
|           e 3 | 7.5  |      | 60 | 10 | 30 |

TABLE 2

| | Amount of Rust (mg/cm$^2$) | | | |
| | | litium silicate | | |
| | calcium nitrite | 0 g/l | 12 g/l | 24 g/l |
|---|---|---|---|---|
| 1.3% NaCl solution | 0 g/l | 1.9 | 1.1 | 0.6 |
| | 4 g/l | 1.9 | 0.6 | 0.6 |
| | 8 g/l | 0.6 | 0 | 0 |
| | 16 g/l | 0 | 0 | 0 |
| 1.3% NaCl and saturated with Ca(OH)$_2$ solution | 0 g/l | 1.2 | 0.8 | 0.5 |
| | 4 g/l | 0 | 0 | 0 |
| | 8 g/l | 0 | 0 | 0 |
| | 16 g/l | 0 | 0 | 0 |

What is claimed is:

1. A process for inhibiting corrosion of steel materials built in inorganic materials, which comprises subjecting the surface of an inorganic material having a steel material built therein to the following steps (A) and (B) in any order:

step (A): applying an aqueous solution of calcium nitrite having a corrision-inhibiting effect on said steel material to the surface of the inorganic material to impregnate said material with the solution, and step (B): applying an aqueous solution of lithium silicate thereto to effect the impregnation, and subsequently, after subjecting the surface of the inorganic material to said steps (A) and (B), subjecting the inorganic material to step (C) as follows:

step (C): topcoating the inorganic material with a cement composition containing a polymer dispersion.

2. A process for inhibiting corrosion of steel materials built in inorganic materials, which comprises subjecting the surface of an inorganic material having a steel material built therein to the following steps (A) and (B) in any order:

step (A): applying an aqueous solution of calcium nitrite having a corrosion-inhibiting effect on said steel material to the surface of the inorganic material to impregnate said material with the solution, and step (B): applying an aqueous solution of lithium silicate thereto to effect the impregnation, and subsequently, after subjecting the surface of the inorganic material to said steps (A) and (B), subjecting the inorganic material to step (C) as follows:

step (C): topcoating the inorganic material with a cement compositon containing a styrene/butadiene rubber dispersion obtained by an anionic polymerization (SBR-A).

3. A process for inhibiting corrosion of steel materials built in inorganic materials, which comprises subjecting the surface of an inorganic material having a steel material built therein to the following steps (A) and (B) in any order:

step (A): applying an aqueous solution of calcium nitrite having a corrosion-inhibiting effect on said steel material to the surface of the inorganic material to impregnate said material with the solution, and step (B): applying an aqueous solution of lithium silicate thereto to effect the impregnation.

* * * * *